United States Patent [19]
Allard

[11] 3,924,953
[45] Dec. 9, 1975

[54] HELIX PITCH MONITOR
[75] Inventor: Frederick C. Allard, Mystic, Conn.
[73] Assignee: The United States of America as represented by the Secretary of the Navy, Washington, D.C.
[22] Filed: Dec. 18, 1974
[21] Appl. No.: 534,040

[52] U.S. Cl............. 356/167; 250/237 R; 356/168; 356/169; 356/171
[51] Int. Cl.² ....................................... G01B 11/14
[58] Field of Search ............ 356/71, 167, 168, 169, 356/170, 171, 242; 250/237 R

[56] References Cited
UNITED STATES PATENTS
3,037,420  6/1962  Stade ................................. 356/169
3,748,043  7/1973  Zipin .................................. 356/171
3,776,640  12/1974  Ikegami ............................. 356/167

Primary Examiner—Alfred E. Smith
Assistant Examiner—Richard A. Rosenberger
Attorney, Agent, or Firm—Richard S. Sciascia; Arthur A. McGill; Prithvi C. Lall

[57] ABSTRACT

The pitch of a helix is monitored by measurement of the reflection of a light source. Segments of a beam of light are reflected off of the helix, through a mask and onto a photodetector that receives light indicative of the proper spacing of the helix. The photodetector then supplies an output signal to a readout device that indicates if proper spacing of the helix being monitored is present.

11 Claims, 5 Drawing Figures

HELIX PITCH MONITOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to quality control devices and more particularly to a system and means for providing indication whether or not a helix pitch is within tolerance during manufacture.

Prior to the present invention the means available to measure the pitch on a moving helix was to apply a machinists thread gauge. While this technique utilizes inexpensive equipment, it is difficult to apply continuously and with a high degree of accuracy. This prior method requires contact with the helix, and in addition, no signal is generated for either automatic process control or for documentation.

SUMMARY OF THE INVENTION

Accordingly, it is a general purpose and object of the present invention to provide an improved quality control system for measuring spacing. It is a further object that the system measure the pitch of a helix during manufacture. Additional objects are that the system provides signals for later analysis and for feedback control. These and other objects of the invention and the various features and details of construction and operation will become apparent from the specification and drawings.

This is accomplished in accordance with the present invention by the generation and processing of optical signals. A deflected laser beam is caused to strike a helix at an oblique angle. The reflected beam is processed and passed through a plurality of windows onto a detector. The signals applied to the detector are converted to electrical signals and these electrical signals are applied to one or more readout devices. In addition it is possible to supply a signal for feedback control of the manufacturing of the helix.

DESCRIPTION OF THE PREFERRED EMBODIMENT

Figure 1:
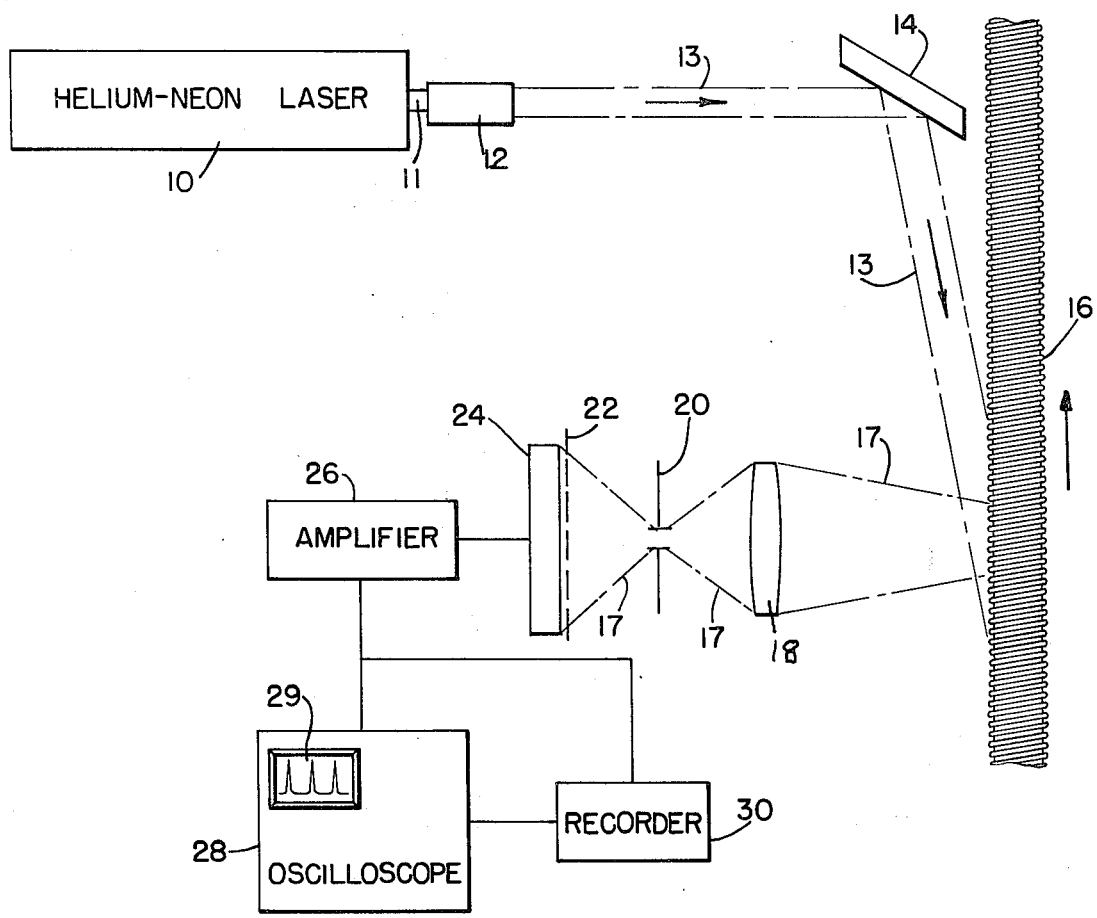
FIG. 1 is a representation of an embodiment of the invention.

Referring now to the drawing and particularly to FIG. 1 there is shown an illumination source 10. The preferred illumination source 10 is a Helium-Neon laser, although other lasers appear applicable as do non-coherent sources of electromagnetic energy such as tungsten filament lamps, arc lamps, etc. The beam 11 after emanating from light source 10 is then expanded and collimated by beam expander/collimator 12 to form a widened beam 13. The widened beam 13 is then reflected by a mirror 14 onto a moving helix 16. It has been experimentally determined that when the helix 16 has a circular cross section the mirror 14 should be adjusted so that the path of the beam 13 intersects the axis of helix 16 forming an angle less than 15°.

A beam 17 forming spatial highlights indicative of the spaced reflective portions of helix No. 16 reflected from the helix 16 and passed through lens 18. The preferred lens 18 is telecentric with a stop 20 forming an aperture at the secondary focal point. However, if the helix 16 has no translational motion toward and away from the lens 18, the need that the lens 18 be telecentric is obviated. The magnification of the lens 18 is somewhat arbitrary with a wide range of magnifications possible. The beam 17 formed is then applied to a mask 22 forming an image of helix 16. The mask 22 has an opaque surface with windows 23 that will be further described below with reference to FIGS. 2 and 3. The beam passing through mask 22 is then applied to a photodetector 24. The photo-detector 24 converts the received illumination signal into an electrical signal. The electrical signal is then amplified by amplifier 26 and applied to display devices such as oscilloscope 28 having cathode ray tube 29 and recorder 30. An additional signal could be provided for feedback to control the machine forming the helix 16.

Figure 2:
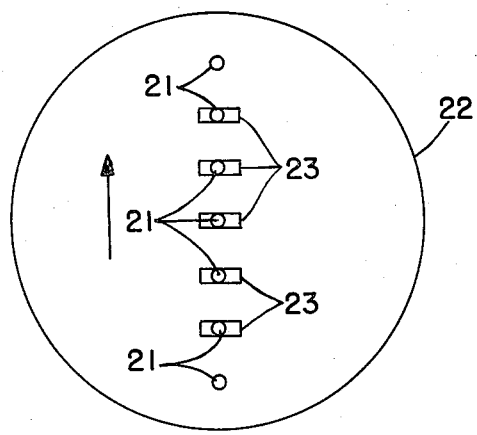
FIG. 2 is a dot pattern on a mask within the embodiment of FIG. 1 indicating perfect pitch on a helix.

Referring now to FIG. 2 there is shown a dot pattern 21, which is an image of helix 16. This dot pattern appears on mask 22 indicating the helix pitch is perfect. The arrow on mask 22 indicates the direction of the moving dot pattern. Note that the dots 21 are in perfect alignment with five windows 23 in the mask 22. The number of windows 23 is somewhat arbitrary with theoretically only two required.

Mask 22 can be fabricated or otherwise formed in several ways. A favored technique is to have mask 22 comprised of film and to expose the film in the mask 22 plane to light in the image of a perfectly dimensioned helix 16. A positive film transparency is then developed to be used operationally. Non-replicative techniques such as ruled slits or punched holes of suitable size and spacing may be used where high precision is not required. Another technique would involve crossed Ronchi rulings or similar gratings to form a variable pitch mask 22. In principle, the highest precision is obtained with perfect replication. The photographic technique explained above thus results in a higher precision monitor than the other methods.

Figure 2A:
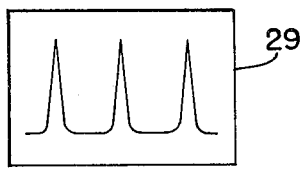
FIG. 2A shows the trace on an oscilloscope when the perfect pitch of FIG. 2 is obtained.

FIG. 2A shows the trace obtained on chathode ray tube 29 on perfect alignment. The peaks are obtained as the dots 21 in FIG. 2 align themselves with respective windows 23.

Figure 3:
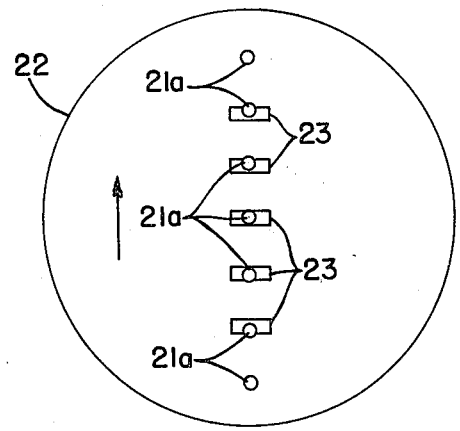
FIG. 3 is a dot pattern on the mask of FIG. 2 indicating imperfect pitch on the helix.

FIG. 3 depicts a dot pattern 21a on mask 22 giving a typical indication that the helix pitch is imperfect. The dot pattern 21a is shown out of alignment with windows 23.

Figure 3A:
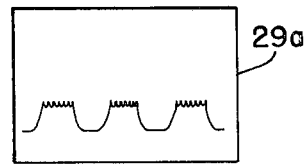
FIG. 3A shows the trace on an oscilloscope when the imperfect pitch of FIG. 3 is obtained.

FIG. 3A shows the trace on cathode ray tube 29a when such misalignment is present. Note the successive smaller peaks as each individual dot 21a aligns itself to a respective window 23.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A pitch monitor for determining quality of spacing on a moving reflector having spaced reflective surfaces comprising:
   a source of electromagnetic energy adapted to generate and conduct a beam onto the moving reflector having spaced reflective surfaces for reflecting spatial highlights of said beam;
   a lens aligned to receive the reflected portion of said beam for forming an image of the reflected spatial highlights of said beams;
   stop means receiving said reflected portion of said beam for establishing telecentricity of said lens;
   opaque means having spaced indicators aligned with said image of spatial highlights upon said reflective surfaces being perfectly spaced for transmitting said image of spatial highlights in alignment with said indicators;
   photodetection means for converting energy in said image of spatial highlights in alignment with said spaced indicators into an electrical signal; and
   readout means connected to receive said electrical signal for providing an indication of the spacing of said reflective surfaces.

2. A pitch monitor according to claim 1 wherein said source of electromagnetic energy further comprises:
   a Helium-Neon laser for generating said beam;
   a beam expander/collimator for expanding and collimating said beam; and
   a mirror for deflecting said expanded and collimated beam.

3. A pitch monitor according to claim 2 wherein said opaque means further comprises a mask including a positive film transparency.

4. A pitch monitor according to claim 3 wherein said readout means further comprises an oscilloscope and a recorder.

5. A pitch monitor comprising:
   a source of electromagnetic energy adapted for generating and conducting a beam;
   a moving reflector having spaced reflective surfaces located in the path of said beam for reflecting spatial highlights said beam;
   a lens aligned to receive the reflected portion of said beam for forming an image of the reflected spatial highlights of said beam;
   stops means receiving said reflected portion of said beam for establishing telecentricity of said lens;
   opaque means for transmitting spaced indicators aligned with said image of spatial highlights upon said reflective surfaces being perfectly spaced;
   photodetection means for converting energy in said image of spatial highlights in alignment with said spaced indicators into an electrical signal; and
   readout means connected to receive said electrical signal for providing an indication of the spacing of said reflective surfaces.

6. A pitch monitor according to claim 5 wherein said moving reflector further comprises a helix.

7. A pitch monitor according to claim 6 wherein said source of electromagnetic energy further comprises:
   a Helium-Neon laser for generating said beam;
   a beam expander/collimator for expanding and collimating said beam; and
   a mirror for deflecting said expanded and collimated beam.

8. A pitch monitor according to claim 7 wherein said mirror is aligned to deflect said expanded and collimated beam into said helix at an angle no more than 15° with the axis of said helix.

9. A pitch monitor according to claim 8 wherein said opaque means further comprises a mask including a positive film transparency.

10. A pitch monitor according to claim 9 wherein said readout means further comprises an oscilloscope and a recorder.

11. A method of measuring pitch on a moving reflector having spaced reflective surfaces comprising the steps of:
   generating a beam;
   expanding and collimating the beam;
   deflecting the beam onto the spaced reflective surfaces at a predetermined angle;
   reflecting highlights produced by said beam striking said spaced reflective surfaces;
   imaging said highlights with a lens having a telecentric stop;
   conducting portions of said imaged highlights arriving at predetermined intervals and inhibiting the remainder of said highlights;
   detecting the conducted portions of said imaged highlights and converting them into electrical signals indicative of the pitch of said space reflective surfaces; and
   displaying said electrical signals.

* * * * *